Aug. 25, 1953  E. J. BARTH ET AL  2,649,813
POWER AND MANUALLY OPERATED GEAR SHIFT
Filed July 19, 1949  3 Sheets-Sheet 3

INVENTOR.
ELMER J. BARTH
PAUL J. SMITH
BY
Bodell + Thompson
Atty

Patented Aug. 25, 1953

2,649,813

UNITED STATES PATENT OFFICE 2,649,813

POWER AND MANUALLY OPERATED GEAR SHIFT

Elmer J. Barth and Paul J. Smith, Toledo, Ohio, assignors to Dana Corporation, Toledo, Ohio, a corporation of Virginia Application July 19, 1949, Serial No. 105,472

8 Claims. (Cl. 74—335)

This invention relates generally to transmission gears for automotive vehicles.

It has for its object a transmission gearing in which the power to drive the vehicle is transmitted through at least two selectable paths, or gear trains, each of which includes a shiftable element, as a clutch, the shiftable element in one train being power shifted, and the shiftable element in the other train being shifted independently of the former element or driver controlled, or manually shifted, and; in addition, control means operated by the shifting mechanism of the manually shiftable element or clutch to control the power shifting of the power shiftable element or clutch out of shifted position preliminary to the shifting in of the manually shiftable element, and to control the shifting in of the power shiftable element until the manually shiftable element has been shifted out.

The invention is here shown as embodied in an auxiliary transmission which may be attached to, or used in conjunction with, a regular or main transmission having the usual gear shifts effected by a gear shifting lever in the usual way. It is intended for duty in heavy vehicles where at times it is necessary to utilize an emergency or sub-low gearing in connection with the regular gearing, and the invention lies in an easy way for effecting the shift into and out of the sublow gearing without modifying the shifts in the main gear box.

The power shiftable element or clutch is in neutral position when not in clutched position so that a power take-off can be used when the vehicle is stationary.

The invention consists in the novel features and in the combinations and construction hereinafter set forth and claimed.

In describing this invention, reference is had to the accompanying drawings in which like characters designate corresponding parts in all the views.

Figure 1:
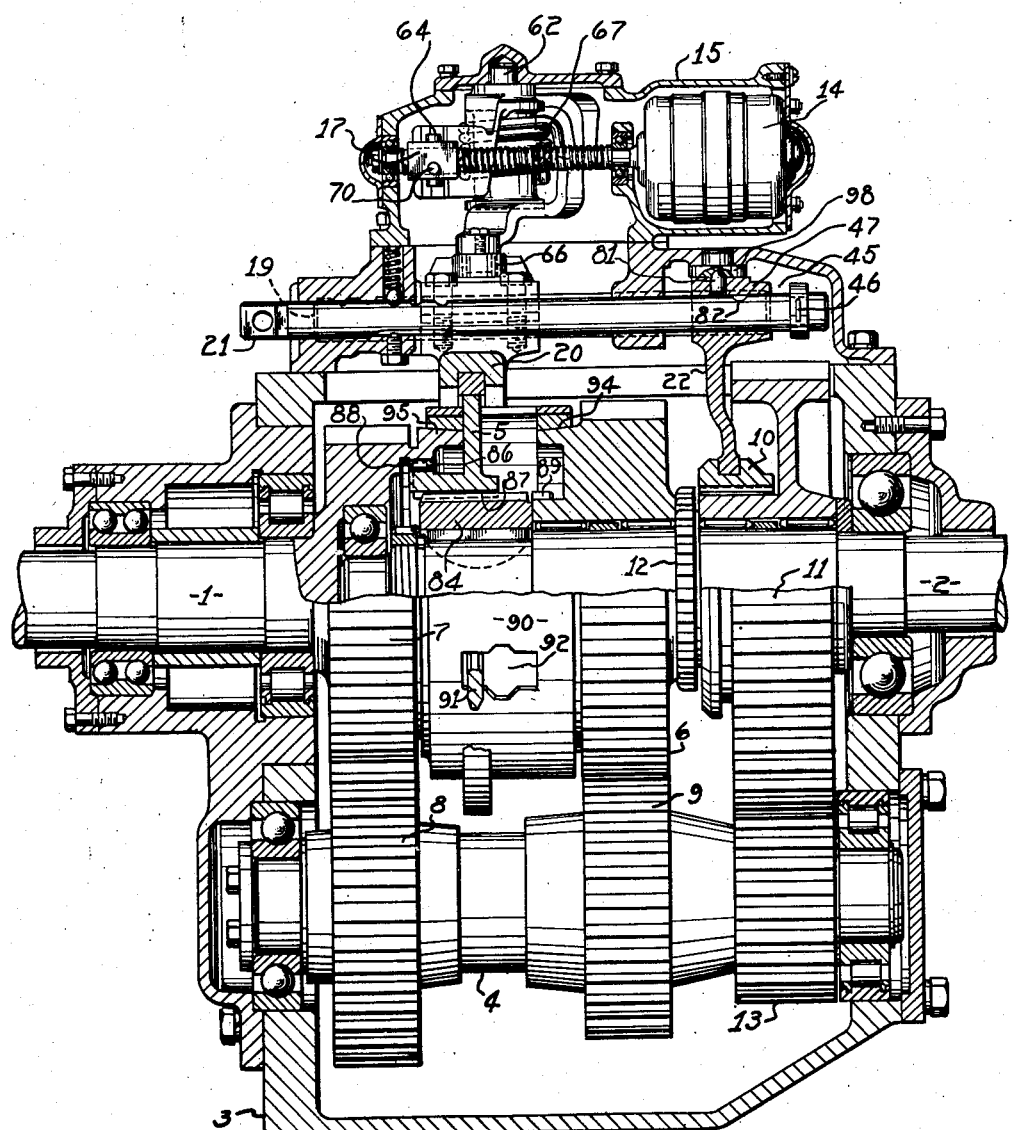
Figure 1 is a longitudinal sectional view of a gearing embodying this invention.

The invention lies, in its general aspect, in a transmission gearing having a power shiftable change speed element, as a clutch, shifting mechanism therefor including a reversible motor, a second shiftable element or clutch shiftable alternately with the first element into and out of engaged or operative position, mechanism for shifting the second element, and a control for the power system of the motor operated by the shift mechanism for the second element.

The transmission mechanism comprises, more specifically, input and output shafts, gear trains between the shafts, each train comprising an element, as a clutch, shiftable into and out of operative or motion transmitting position, the elements being alternately operable into operative position, that is either element is in operative position while the other is out, power mechanism including a reversible motor for shifting one only of said elements, a second mechanism for shifting the other of said elements including a shift member, the second mechanism being usually driver controlled or manually operable independently of the power operated mechanism, and means operated by the shift member of the second mechanism to successively reverse the motor of the power mechanism to shift out the engaged power shiftable element and cut out the flow of power to the motor while the shiftable member of the second mechanism is being actuated from starting position on its shifting in movement and the element shifted by the second mechanism is short of operative motion transmitting engagement, and to successively shift out the element operated by the second mechanism and again cut in the power to the motor upon moving of the shift member of the second mechanism back to starting position.

The gearing further includes an interlock between the shift mechanisms and operable thereby to maintain the operation of the shiftable elements, or clutches, in alternate relation—that is, to lock either shiftable element from being shifted into operative position while the other element is in and being shifted out of operative or clutching position.

1 and 2 designate the input and output shafts of the gearing mounted in axial alinement in suitable bearings in a gear box 3, 4 is a countershaft mounted in the gear box. 5 and 10 designate shiftable elements controlling the transmission of power in different paths or through different gear trains between the input and output shafts. The element 5 is double and when shifted in one direction, as to the left from central or neutral position, clutches the shafts 1 and 2 directly together in one path or gear train, this being a direct drive, and when shifted in the other direction from neutral shifts into clutching engagement with a gear 6 on the output shaft 2, which is actuated from the input shaft 1 through a gear 7 on the input shaft, a countershaft gear 8 meshing with the gear 7, and countershaft gear 9 meshing with the gear 6. The element or clutch 10 is slidably splined on the hub of a gear 11 rotatably mounted on the output shaft and is shiftable, as to the left, into engagement with a clutch face 12 on a collar fixed on or intergral with the shaft 2 to clutch the gear 11 to the shaft 2. The gear 11 meshes with a gear 13 on the countershaft so that when the element or clutch 10 is in engaged position, the output shaft 2 is driven through a reduction train of gears including the gears 7, 8, countershaft 4, gears 13 and 11.

Either the direct drive through the clutch 5 or the indirect drive through the gears 7, 8, 9 and 6, constitutes one path or train of gears, and the gears 7, 8, 13 and 11 constitute another or second path of transmission of power from the input shaft 1 to the output shaft 2, the last train being usually an emergency sublow.

The clutch or element 5 is power shifted, and the clutch 10 is shifted independently of the power shift by other shift mechanism. It is usually manually shifted. The power utilized for shifting the clutch 5 is, in this embodiment of our invention, electrical and comprises a reversible electric motor 14 mounted in a casing 15 which is suitably mounted on the top of the gear box 3, the motor having a feed screw device 16 actuated by its rotor which feed screw, through mechanism to be described, operates a nut 17 on the screw device, and the motion of the nut is transferred to a fork 20 on a shift rod 19 suitably mounted in the casing 15 and connected to the shiftable clutch 5.

The mechanism for shifting in the clutch 10 comprises a shift member as a rod 21 slidably mounted in the casing 15 and operating a fork 22 connected to the clutch 10. The shift rod 21 is here shown as operated by a manual lever 23, Figure 2, which is normally in starting position and is movable from starting position to an intermediate or neutral position and finally into shifted position. The rod when moving from starting position, shifts relatively to the fork 22 and in so doing, the lever 23 moves to neutral position without shifting the fork 22 where, through a suitable coupling, the fork 22 is clutched to the rod 21 so that final movement of the lever 23 to the end of its shifting in movement, shifts in the clutch 10.

The starting position of the lever 23 is for convenience called the preselect position because then the clutch 5 is operable to be shifted from direct drive position to indirect drive position, or from indirect drive position to direct drive position. When the lever 23 is operated from preselect or starting position to neutral position, the clutch 5 is first shifted by the motor to neutral position and the motor deenergized and continued movement of the lever 23 from neutral position shifts the clutch 10 into engaged position.

The power system for the motor 14 comprises a switch 25 carried by the gear shifting lever 26 of the main gear box, this switch controlling two feed circuits to the motor 14. It is operated by a button or plunger 27. One of the circuits supplies current to the reversible motor 14 causing it to rotate in the direction to shift the clutch 5 out of direct drive to the right to the indirect drive position. The other of the feed circuits supplies current to said reversible motor causing it to rotate in the direction to shift the clutch 5 out of indirect drive to the left to the direct drive position. The switch 25 is preset by the button 27 to preselect one or the other of the direct drive, or the indirect second speed positions. It is set in the direct drive position in the drawings and therefore, the clutch 5 is in the position shown in Figure 1, that is, shifted in to the left. The shift was made to the left upon depression of the engine clutch pedal 28 by the current passing from the battery or source of supply 29, through an overload relay switch 30, wire 31, switch 32, which was operated to closed position when the clutch pedal 28 was depressed, wire 33, switch 34, switch contact 35, wire 36, to the switch 25 which, by reason of the position of the button 27, is in circuit with wire 37, through wire 37 to switch contact 38, which before the shift is made is engaged with contact 39, thence through branch wire 40 to terminal 41 of the motor 14, thence through grounded wire 42. With this circuit completed, the motor is actuated in one direction to turn the screw device 16 in one direction to shift the nut 17 to the left and hence, shift in the clutch 5 in direct drive. At the end of the shifting in movement, the nut 17 opens the cut-out switch 38 and incidentally closes the switch 380, and also reverses the reversing switch 43 in one direction into engagement with the contact 44, similar to the contact 39. Now, if the driver operates the shift lever 23 for the emergency low shift rod 21, the rod 21 is first shifted from starting or preselect position to neutral position, taking up a lost motion at 45 between a shoulder 46 on the rod 21 and the hub 47 of the fork 22 which is mounted on the rod. This movement causes an elongated notch 48, Figure 2, in the rod 21 to aline with a pin or plunger 49 and permit the pin 49 to enter the notch under the influence of a spring 50. The spring 50 operates the switch 34 and when the pin enters the notch 48, permits the switch 34 to break engagement with the contact 35 and engage contact 51. Now upon depression of the clutch pedal 28, the switch 32 is again closed and this time the current passes through the manual or neutral shift circuit from the battery through the switch 32, wire 33, switch 34, to contact 51, through wire 52, to reversing switch 43 which is now in the position shown in Figure 2, thence through contact 44 and thence through wire 53 to the terminal 54 of the motor 14, thus energizing the motor to reverse it and shift the nut 17 to the right and in so doing, shifting the fork 20 to the right, thus shifting out the clutch 5 to neutral. The movement of the nut again reverses the switch 43 out of engagement with the contact 44, thus breaking the circuit to the motor so that the motor is again idle, or disabled. Switch 43 comes to rest in its neutral position, not contacting either contact 39 or 44. The lever 23 can then complete its shifting in movement, shifting in the clutch 10.

Now, when the driver wishes to resume the normal drive with the clutch 5 in engaged position, he shifts the lever 23 back to neutral, first depressing the clutch pedal 28 to relieve torque on transmission parts, so that now the current passes from the battery through the closed switch 32, wire 33, switch 34, which is still in engagement with the contact 51, because the pin 49 is still in the notch 48, thence through wire 52 through the switch 380 and through wire 53 to the terminal 54 of the motor 14. The lever 23, in the meantime, has been moved to preselect or starting position causing the end of the notch 48 to engage pin 49 and push it outwardly from rod 21, thus disengaging switch 34 from contact 51 and engaging it with contact 35. The clutch 5 is then shifted back to its preselected shifted position, or in the left hand position, Figure 1, because current then flows through the power shift circuit which has no neutral position. As it reaches this position, reversing switch 43 is again reversed to the position shown in Figure 2. Because of the construction of the motion transmitting means between the nut 17 and the shifting fork 20, the clutch can continue its shifting in movement due to a spring arrangement in the clutch mechanism after the reversing switch 43 reverses. A similar operation takes place when the plunger 27 of the selecting switch 25 is set in second position to shift the clutch 5 to the right to clutch the gear 6 to the output shaft 2, except that the current is supplied to the motor through the cut-out switch 380 and wire 53 instead of through switch 38.

Figure 3:
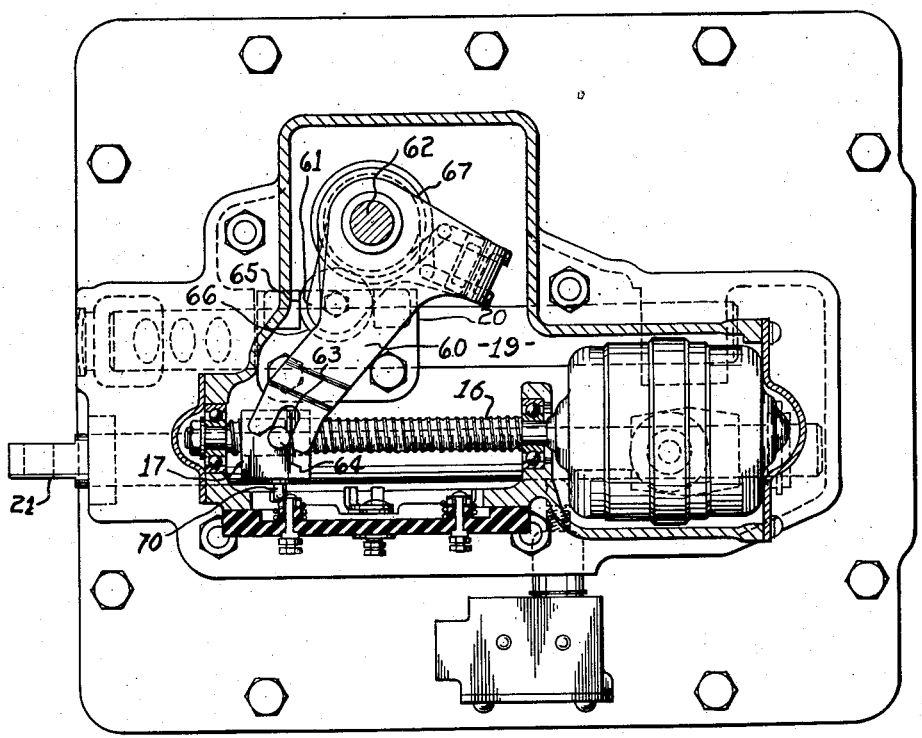
Figure 3 is a plan view, partly in section, looking downwardly in Figure 1.

As here shown, the motion transmitting means between the nut 17 and the block 20 consists of two levers 60 and 61 mounted on a common spindle or shaft 62 supported in the casing 15, one lever 61 being bifurcated and having radial slots 63, see Figure 3, at its end for receiving trunnions 64 on the nut 17, and the other lever 61 working in a slot or between shoulders 65 on the fork 20, this arm having a roller 66 working between the shoulders. The motion of the levers 60, 61, is transferred one to the other through a torsion spring 67 coiled about the shaft 62 and having arms at its ends thrusting against the levers respectively.

The cut-out switch contact 38 and a similar cut-out contact 380 in the second line 80 from the selecting switch 25 and also the reversing switch 43 are shifted by a pin 70 on the nut 17. Assuming the reversing switch 43 is in neutral position, the selecting switch 25 set in direct drive position and the cutout switch contact 38 closed by its spring and incidently, the contact 380 also closed and the manual shift lever 23 in preselect position and hence the switch 34 engaging the contact 35; the driver closes the clutch pedal operated switch 32, completing a circuit through the switch 25 to the terminal 41 of the motor to actuate the motor to move the nut 17 to the left and shift the clutch 5 from neutral to the left into direct drive position. This movement first shifts the reversing switch 43 into engagement with contact 44 and then, as the nut 17 approaches the end of its travel to the left, engages and shifts out the contact 38 against its returning spring, thus opening the feed circuit to the motor so that the clutch 5 remains in direct drive position. Now, as the shift is to be made to emergency low, the manual shift lever 23 is moved from preselect position to neutral position, shifting the rod 20 to carry the notch 48 into registration with the pin or follower 49, letting the switch 34 engage the contact 51 so that now the motor is energized through the contact 44, reversing switch 43 now in contact therewith, and motor contact 54, reversing the motor and the nut 17 to shift the clutch 5 out of direct drive position to neutral position. During the movement of the nut to neutral, it first lets the cut-out switch or contact 38 reengage the contact 39 and then shifts the reversing switch 43 from the position shown in Figure 2 to neutral position. Continued movement of the shift lever 23 from neutral position shifts in the clutch 10.

Figure 4:
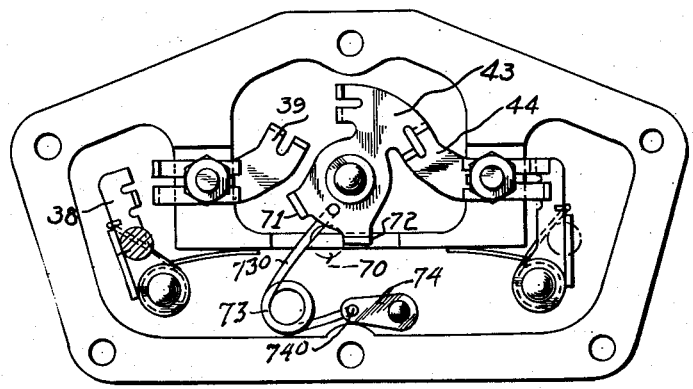
Figure 4 is a fragmentary plan view of the reversing means or switches for the reversible motor.

The reversing switch is of the snap, or over-the-center, or toggle type, of any conventional construction. In Figure 4, the pin 70 on nut 17 has been shifted to the right to engage shoulder 72 of two spaced shoulders 71, 72, on the reversing switch. Further movement to the right will cause the reversing switch to be shifted over to the left toward contact 39. The movement of the switch to the left loads a spring 73, one arm 730 of which is anchored to the switch 43 eccentric to the axis thereof, and the other arm of which is pivoted to a toggle link 74 at 740. When the switch 43 is shifted to neutral or central position, the toggle joint 740 will have moved downward through the dead center line of the toggle, letting the spring react with a snap action and bring the contact of the switch 43 into engagement with the contact 39. During reverse movement of the nut 17 and pin 70 to the left, the pin 17 engages the shoulder 71 and snaps the reversing switch 43 back into engagement with the contact 44 by loading the spring so that it reacts when the toggle joint 740 passes above the dead center line of the toggle into the position shown in Figure 4.

Interlocking means prevents the clutch 10 from being shifted into engaged position while the clutch 5 is in engaged position and while being shifted out of that position. That is, the interlocking means prevents shifting in of the clutch 10 unless the clutch 5 is in neutral position. When the selecting switch 25 is in indirect drive or second position, the operation is the same except the current is supplied to the motor 14 through the wire 80 and cut-out switch or contact 380.

Figure 2:
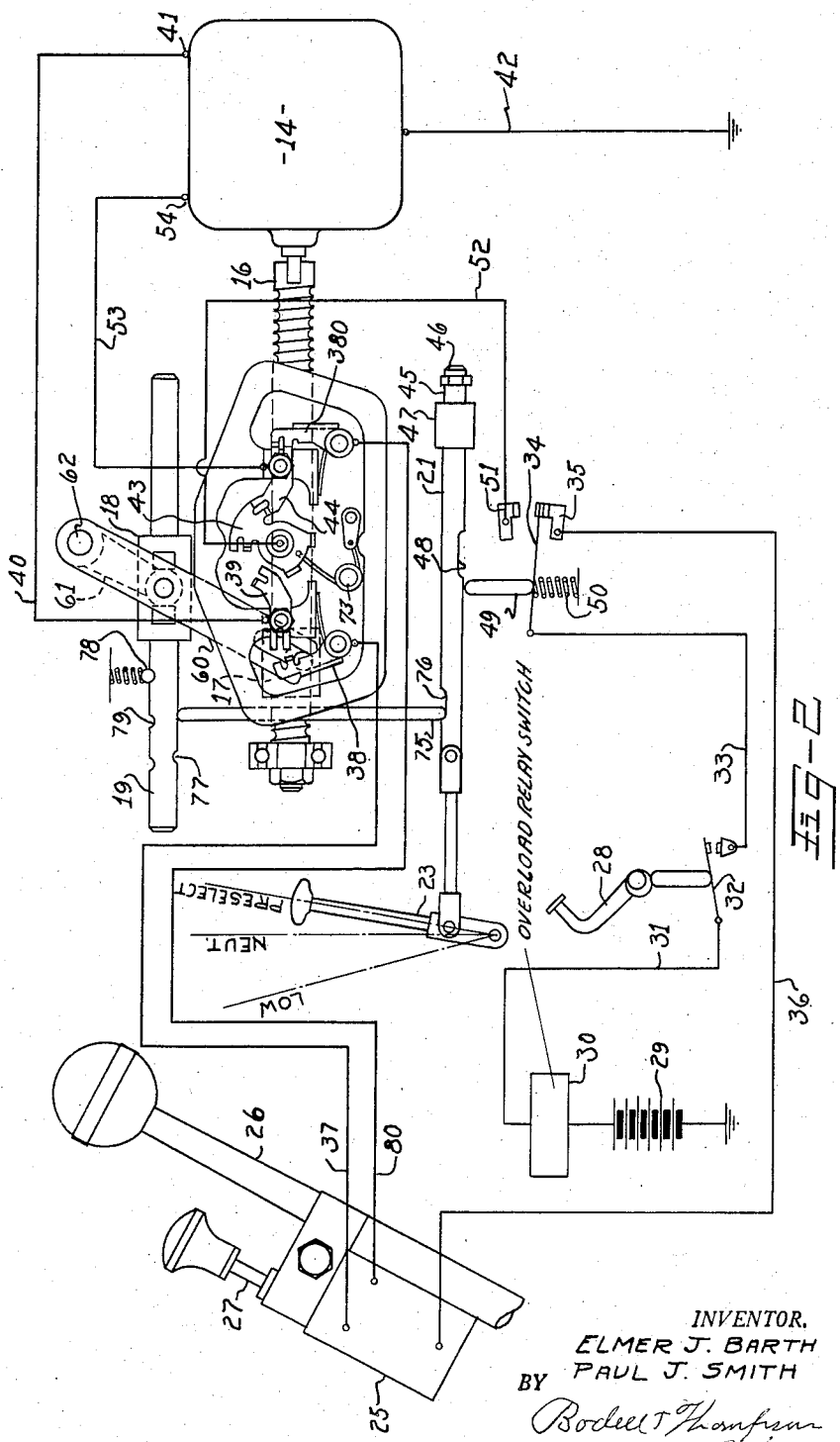
Figure 2 is a diagrammatic view of the operating system therefor.

The interlocking mechanism for preventing shifting of the clutch 5 into either of its engaged positions while the clutch 10 is in engaged position, and for preventing shifting in of the clutch 10 until the clutch 5 has been shifted out of either of its engaged positions to neutral position, may be of any suitable type, it being here shown as a transversely extending, axially shiftable rod 75, Figure 2, having one end for entering a notch 76 in the shift rod 21, and its other end for entering a notch 77 in the rod 19 when the notch is alined with the rod 75. The spacing between the shift rods 21 and 19 is such that when one end of the rod 75 is in the notch 76 and the other end is engaged with the periphery of the rod 19, the rod 21 can not be shifted and that when the rod 75 is interlocked in the notch 77, the rod 21 is released and can be shifted into engaged position. A suitable spring pressed poppet 78 coacts in the usual manner with notches 79 in the rod 19 to steady it when in any one of these shifted positions and especially to locate the rod 19 and its fork in neutral position when the rod 75 is in the notch 77.

When the plunger 27 of the preselecting switch 25 is depressed to select the second speed or indirect drive position of the clutch 5, that is the position when the clutch 5 is shifted by the motor 14 to the right to clutch the gear 6 to the output shaft 2, the energizing current for the motor flows as follows: When the clutch pedal 28 is depressed to close the switch 32 preliminary to the shifting in of the clutch 5 to the right into second position; from the battery 29 to the closed switch 32, switch 34, which is engaged with contact 35, thence to preselecting switch 25, through wire 80, the cut-out switch contact 380, contact 44 and branch wire 53, to the motor, thus actuating the motor 14 to shift the nut 17 and the fork 20 to the right from neutral, shifting in the clutch 5 to the right to clutch the gear 6 to the output shaft 2, the shifting in operation reversing the reversing switch 43 so that it will be in such position to again reverse the motor in case the shift lever 23 is operated to shift in the clutch 10. If the shift lever 23 is operated to shift in the low gear, the clutch pedal 28 is operated preliminary to making the shift, thus closing the switch 32 so that the current passes from the battery 29 through the switch 32, the switch 34, to the contact 51, which has been closed by reason of the shifting of the rod 21, or the shift lever 23 to neutral position, thence to the reversing switch 43, contact 39 and branch wire 40 to the other terminal 41 of the reversible motor, thus reversing the motor and shifting out the clutch 5 to the left to neutral position, the reversing switch coming to its neutral position during this operation.

The switches 38 or 380 and the switch 43 are respectively a cut-out switch and a reversing switch in the feed circuit of the motor controlled and timed in their operation by the motor, or the nut 17 actuated by the feed screw on the rotor of the motor. The cut-out switch 38 is in the direct drive circuit selected by the selecting switch 25 and being closed when the clutch 5 is in neutral position. The switch 38 is shifted out to stop the motor at the end of the shifting in movement of the clutch 5 by the nut 17, and the reversing switch 43 shifts to reverse position by the nut 17 at the beginning of the shift-in movement of the clutch 5. The cut-out switch 38 is opened at the end of the shifting in movement of the clutch 5 and the reversing switch 43 reshifted into re-reversing or obverse position at the beginning of the shifting in movement of the clutch 5. The cut-out switch 38 is in the direct drive circuit controlled by the selecting switch 25, and the cut-out switch 380 is in the indirect drive circuit controlled by the selecting switch 25. The switch 34 is a driver controlled switch operated by the manual shift lever 23 on the shift rod 20 for the clutch 10 and controlling the energization and timing of the motor 14 and the shifting of the clutches 5 and 10.

The fork 22 for the clutch 10 is coupled to the shift rod 21 by a coupling which permits the rod to be first shifted through a lost motion relatively to the fork while the rod is being shifted from preselected position to neutral position and then pick up the coupling to shift the clutch 10 into engaged position. The coupling also permits shifting out of the clutch 10 in the reverse order. The coupling consists of a radial poppet 81, Figure 1, located in the hub 47 of the fork 22 and pressing radially against the periphery of the rod 21, and located to enter a notch 82 in the rod when the rod has been shifted, as to the left, from starting or preselected position into neutral position. At that time, the shoulder 46 abuts against the end of the hub of the fork 22. Further movement of the rod 21 to the left will move the fork 22 to engage the clutch 10, and also lock poppet 81 between the flat surface of button 98 and notch 82 in the rod 21, the poppet 81 moving to the left with the fork 22 at this time.

The clutch 5 is provided with a synchronizer of conventional construction. The clutch 5 is here shown as slidably splined on a collar 84 keyed to the output shaft 2 and as having clutch teeth 86 and 87 at its opposite ends, the clutch teeth 86 being peripheral and coacting with complemental internal teeth 88 on the gear 7 and the clutch teeth 87 being the right hand ends of the splines of the clutch 5 and coacting with peripheral clutch teeth 89 on the hub of the gear 6. The synchronizer is a sleeve 90 mounted in the usual manner concentric with the clutch 5 and having the usual circumferential rocking movement within limits. The sleeves is connected to the clutch 5 to rotate therewith by the usual slots 92 through which radially extending spokes 91 on the clutch 5 extend.

The sleeve is provided with friction faces 93, 94, at its opposite ends for coacting with complemenal faces on the gears 7 and 6 respectively. When the clutch 5 is shifted from neutral in one direction or the other, the friction face at one end first engages the complemental face on the gear 7 or 6, thus effecting the synchronization and stopping the shifting-in of the clutch 5 until the speeds synchronize when the shifting-in force overcomes the usual yielding connection, not shown, between the clutch 5 and the synchronizer sleeve 90, whereupon the teeth of the clutch 5 shift into interlocking engagement with the complemental teeth without clashing.

If the spring 67 is purposely made weak enough, it yields and stores up power under the influence of the motor actuated screw 16 and then when synchronization occurs, the spring completes the shifting-in after the motor is stopped by the shifting of the cut-out switch 38 or 380, as before described. If however, the spring is made sufficiently strong to stall the motor before the cut-out switch 38 or 380 is opened, the motor remains stalled until synchronization occurs when the motor resumes its operation until the nut 17 has resumed its movement under the motor far enough to complete the shifting-in of the clutch 5.

By this invention, the driver can easily shift to another gear, as emergency low gear, without operating the gear shifting lever of the main gear box, and a shift into the additional or emergency gear can be made by merely shifting the lever 23, and all other operations, such as the power shifting of other clutches or gears that must be shifted out during the shifting of the emergency gear takes place automatically by the shifting of the lever 23, or the shift rod 21, both when the shift is being made into and out of the emergency gear.

What we claim is:

1. In a transmission gearing, input and output shafts, trains of gears between the shafts, each train comprising an element shiftable into and out of operative motion transmitting position, said elements being alternately operable relatively to each other into and out of operative position, power mechanism including a reversible motor for shifting one only of said elements in reverse directions, a power system for the motor, a second mechanism for shifting the other element only comprising a shift member, power controls in the power system including cut-out and reversing power control members operated successively by the reversible motor when at the beginning and at the end of the shifting operations of the motor and including also an interlock between said mechanisms and operable thereby to maintain the operation of the shiftable elements by the two shift mechanisms in alternate relation.

2. In a transmission gearing, input and output shafts, trains of gears between the shafts, each train comprising an element shiftable into and out of operative motion transmitting position, said elements being alternately operable relatively to each other into and out of operative position, power mechanism including a reversible motor for shifting one only of said elements in reverse directions, a power system for the motor, a second mechanism for shifting the other element comprising a shift member, power controls in the power system including a control member operated by the shift member of the second mechanism, and cut-out and reversible power controls operated successively by the reversible motor when at the beginning and at the end of the shifting operations of the motor, and an interlock between said mechanisms and operable thereby to maintain the operation of the shiftable elements by the two-shift mechanism in alternate relation, the motor being a reversible electric motor and the power system comprising an electric feed circuit, the control member operated by the shift member of the second mechanism being a switch, the control members operated by the motor being a reversing switch and a cut-out switch closed during the shifting operations, the reversing and cut-out switches being operable to closed and open positions respectively successively by the motor during the beginning of the shifting-in operation and the end of the shifting-in operation, and the cut-out switch and the reversing switch being movable to closed position and open position respectively during the beginning of the shifting out operation and the end of the shifting out operation.

3. In a transmission gearing, input and output shafts, a transmission path between the shafts comprising an element shiftable into and out of operative motion transmitting position, power shift mechanism including a reversible motor for shifting said element, a power cut-out member and a power reversing member in the power supply system, a reversible shift block actuated by the motor and means operated by the block to successively shift the power reversing member to a reverse position from neutral and the power cut-out member to cut-out position at the beginning and the end of the shifting-in movement, and to shift the cut-out member back to power cut-in position and the reversing member to neutral position successively during the beginning and end of the shifting out movement of the block, and a driver operated power control member in the supply system.

4. In a transmission gearing, input and output shafts, a transmission path between the shafts comprising an element shiftable into and out of operative motion transmitting position, power shift mechanism including a reversible electric motor having a rotor formed with feed screw means and a nut movable lengthwise of the feed screw during turning of the feed screw, a main feed circuit for the motor having branches leading to opposite terminals of the motor, a reversing switch operable from neutral position to connect either branch in the main circuit, a normally closed cut-out switch in the main circuit, a motion transmitting connection operated by the nut to successively operate the reversing switch from neutral to reverse position and the cut-out switch to open position during the beginning and end respectively of the travel of the nut to engage the power shiftable element, and to close the cut-out switch and shift the reversing switch to neutral successively during the beginning and end of travel of the nut in the opposite direction, and a driver-operated switch in the feed circuit.

5. In a transmission gearing, input and output shafts, gear trains between the shafts having respectively first and second motion transmitting elements shiftable into and out of operative motion transmitting position, said elements being alternately operable relatively to each other into and out of operative position, power mechanism for shifting one only of said elements, a second mechanism operable independently of the power mechanism for shifting the other of said elements, the power mechanism including a reversible motor, a shift member operated thereby and a fork connecting the power shift member and the power shiftable element, the second mechanism including a second shift member and a fork connecting it and the second shiftable element, the second shiftable element being normally in inoperative or disengaged position, a power system for the motor, a control element in the power system shiftable for conditioning the motor for operation in opposite directions reversible by the motor during its operation in one direction and reversible in the opposite direction by the motor when the motor is being actuated in the opposite direction, and a second control element in the power system in series with the first control element in the power system and operable by the shift member of the second mechanism into power conducting position.

6. In a transmission gearing, input and output shafts, gear trains between the shafts having respectively first and second motion transmitting elements shiftable into and out of operative motion transmitting position, said elements being alternately operable relatively to each other into and out of operative position, power mechanism for shifting one only of said elements, a second mechanism operable independently of the power mechanism for shifting the other of said elements, the power mechanism including a reversible motor, a shift member operated thereby and a fork connecting the power shift member and the power shiftable element, the second mechanism including a second shift member and a fork connecting it and the second shiftable element, the second shiftable element being normally in inoperative or disengaged position, a power system for the motor, a control element in the power system shiftable for conditioning the motor for operation in opposite directions reversible by the motor during its operation in one direction and reversible in the opposite direction by the motor when the motor is being actuated in the opposite direction, and a second control element in the power system in series with the first control element in the power system and operable by the shift member of the second mechanism into power conducting position, the shift member of the second mechanism being connected to the second fork by a lost motion coupling permitting movement of the second shift member relative to the second fork an amount sufficient to operate the second control element in the power system before the second shiftable element is shifted into engaged position, and permitting the relative movement of the second shift member and second shiftable power transmitting element in the reverse order during shifting of the second shiftable power transmitting element out of operative engagement to starting position.

7. In a transmission gearing, input and output shafts, gear trains between the shafts having respectively first and second motion transmitting elements shiftable into and out of operative motion transmitting position, said elements being alternately operable relatively to each other into and out of operative position, power mechanism for shifting one only of said elements, a second mechanism operable independently of the power mechanism for shifting the other of said elements, the power mechanism including a reversible motor, a shift member operated thereby and a fork connecting the power shift member and the power shiftable element, the second mechanism including a second shift member and a fork connecting it and the second shiftable element, the second shiftable element being normally in inoperative or disengaged position, a power system for the motor, a control element in the power system shiftable for conditioning the motor for operation in opposite directions, said control element being reversible by the motor during its operation in one direction and reversible in the opposite direction by the motor when the motor is being actuated in the opposite direction, and a second control element in the power system in series with the first control element and operable by the shift member of the second mechanism into power conducting position, a power control in series with the second control element normally out of power conducting position, and an operator operated part operable preliminary to gear changing operations and connected to the last control to shift it into power conducting position.

8. In a transmission gearing, input and output shafts, gear trains between the shafts having respectively first and second motion transmitting elements shiftable into and out of operative motion transmitting position, said elements being alternately operable relatively to each other into and out of operative position, power mechanism for shifting one only of said elements, a second mechanism operable independently of the power mechanism for shifting the other of said elements, the power mechanism including a reversible motor, a shift member operated thereby and a fork connecting the power shift member and the power shiftable element, the second mechanism including a second shift member and a fork connecting it and the second shiftable element, the second shiftable element being normally in inoperative or disengaged position, a power system for the motor having a control element in the power system shiftable by the conditioning of the motor operation in reverse direction therein reversible by the motor during its operation in one direction and reversible in the opposite direction by the motor when the motor is being actuated in the opposite direction, and a second control element in the power system in series with the first control element and operable by the shift member of the second mechanism into power conducting position, and an interlock between the shift members and operable thereby to lock either shift member from complete shifting-in movement when the other shift member is in operative position and thereby maintaining the alternate shifting of the shiftable elements.

ELMER J. BARTH.
PAUL J. SMITH.

References Cited in the file of this patent

UNITED STATES PATENTS

| Number | Name | Date |
|---|---|---|
| 2,383,616 | Randol | Aug. 28, 1945 |
| 2,430,799 | Aspinwall | Nov. 11, 1947 |
| 2,462,779 | Russell | Feb. 22, 1949 |

FOREIGN PATENTS

| Number | Country | Date |
|---|---|---|
| 39,289 | France | Oct. 12, 1931 |
| | (Addition to No. 677,473) | |
| 487,504 | Great Britain | June 22, 1938 |